April 21, 1936. C. J. KUMMER 2,037,985
DOUGH TWISTING MECHANISM
Filed Nov. 12, 1934   2 Sheets-Sheet 1
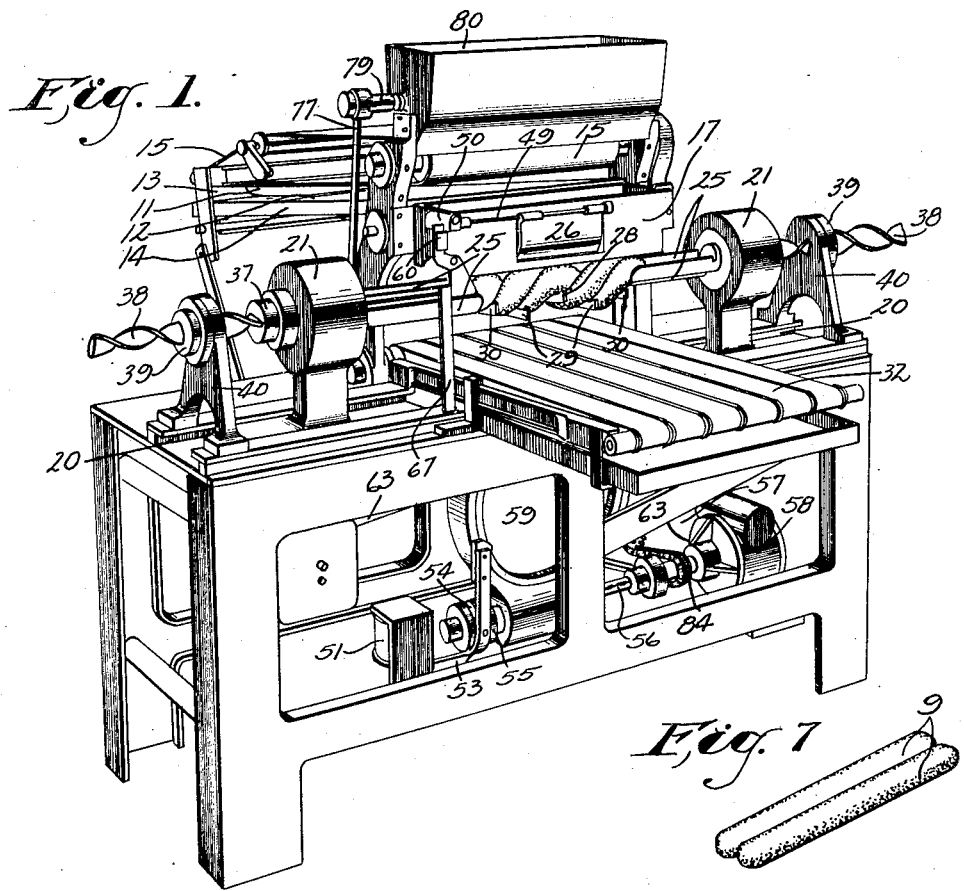
Fig. 1.
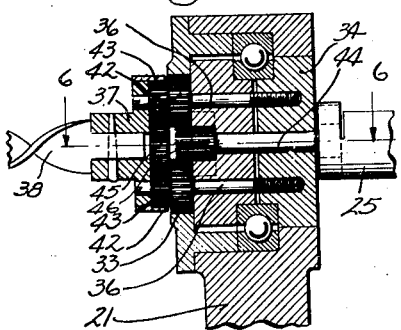
Fig. 5.
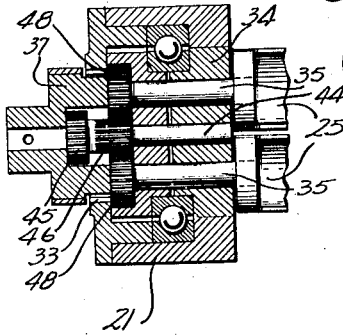
Fig. 6.
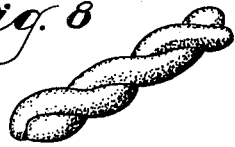
Fig. 7.
Fig. 8.
INVENTOR
Charles J. Kummer
BY
*Mueler, Mueler and Mueler*
ATTORNEYS April 21, 1936. C. J. KUMMER 2,037,985
DOUGH TWISTING MECHANISM
Filed Nov. 12, 1934 2 Sheets-Sheet 2
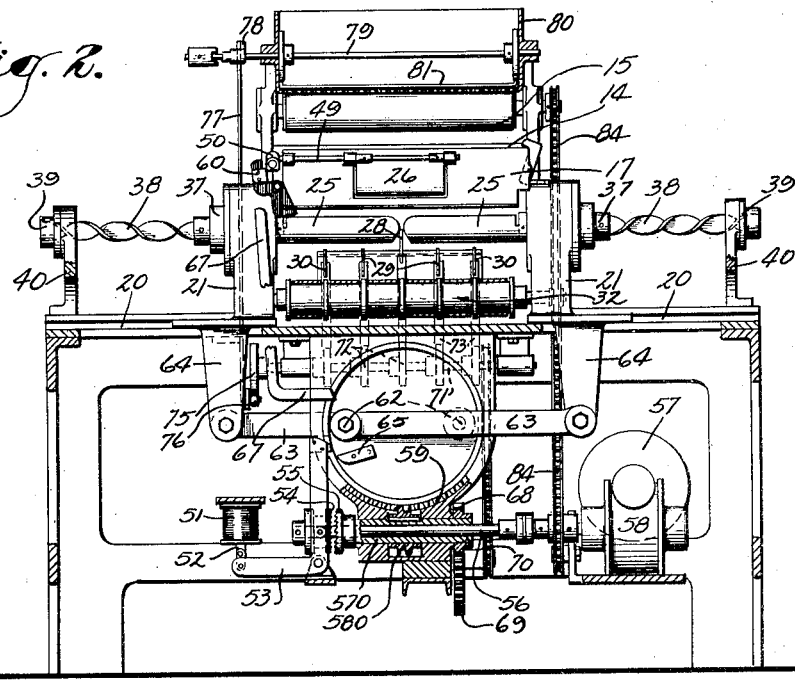

Patented Apr. 21, 1936

2,037,985

UNITED STATES PATENT OFFICE 2,037,985

DOUGH TWISTING MECHANISM

Charles J. Kummer, Sheboygan, Wis., assignor to Sheboygan Machine Company, Sheboygan, Wis., a corporation of Wisconsin Application November 12, 1934, Serial No. 752,674

15 Claims. (Cl. 107—8)

This invention relates to improvements in the art of preparing twisted bread for baking.

It is the object of the invention to provide novel and improved means for twisting or braiding together two elongated pieces of dough.

More particularly stated, it is my object to provide a novel and simple means for twisting pieces of dough together in a definite and positive manner to produce loaves of predetermined form. It is one of the purposes of the invention to deliver the piece of dough to a hopper from which successive pieces are alternately delivered to different pairs of aligned troughs or buckets wherein the dough is supported during the twisting operation. Another purpose is to provide means for automatically setting the buckets in operation as soon as the second piece of dough has been deposited in its proper place and to withdraw the buckets gradually from beneath the dough as the twisting operation progresses, other supporting means being progressively substituted for the buckets until the twisting operation is complete, the twisted loaf being then deposited on a conveyor for delivery from the machine.

In the drawings:

Figure 1 is a view in perspective, of apparatus embodying the invention.

Figure 2 is a front elevation of the device shown in Figure 1 with portions of the apparatus broken away in longitudinal section to expose the details of construction.

Figure 3 is a view of the apparatus partially in end elevation and partially in section.

Figure 4 is a detail view taken in section on the line indicated at 4—4 in Figure 3.

Figure 5 is an enlarged detail showing the twisting head in vertical axial section.

Figure 6 is a view of the twisting head taken on line 6—6 of Figure 5.

Figure 7 shows the pieces of dough prior to the twisting operation as they appear in perspective.

Figure 8 is a perspective view of the completed loaf as delivered from the machine.

Like parts are identified by the same reference characters throughout the several views.

The pieces of dough 9 are formed individually by known means and delivered from the molder by a conveyor 10 which discharges each blank successively upon the upwardly curving apron 11 of a table 12 having depressed side margins 13 as shown in Fig. 4.

It has been found that the depressed side margins are important to the successful delivery of the dough piece in a straight line on the conveyor table 14 by belt 15.

As each piece is dropped upon the table 12 its central portion, being supported, is engaged by the conveyor 15, which rolls the piece up the table 14 to a hopper 17. Hopper 17 contains a gate 18 pivoted at 19 and so unbalanced as to tend by gravity to assume one or the other of its extreme positions diagonally of the hopper as shown in Fig. 3. As each piece of dough falls through the hopper it necessarily throws the gate to the other position.

Slidable in the ways 20 are the twister heads 21, each of which supports for revolution about a common axis, and for rotation upon their own axes, a pair of semi-tubular open ended buckets 25. When the terminal heads are in their closest relation to each other as shown in Figs. 2 and 3, their respective buckets are axially aligned with each other to form a pair of approximately continuous troughs between the twister heads 21 into which the pieces of dough may be deposited alternately from the hopper 17 under the control of gate 18.

The piece of dough shown in Fig. 3 at the point of dropping into hopper 17, will necessarily be diverted by gate 18 into the rearmost buckets 25. As this piece passes the gate 18, however, it will throw the gate to the opposite diagonal of the hopper, whereby the next piece of dough entering the hopper will be deposited in the forward pair of buckets 25. As this subsequent piece passes through the hopper it will force forwardly a control member 26 which normally hangs in its path, as clearly shown in Fig. 3. The movement of this control member will operate through mechanism hereinafter to be described, to set the mechanism in motion for the twisting of the pieces of dough lying in their respective pairs of troughs.

The twister heads 21 will begin to slide away from each other, as shown in Fig. 1. As they move away from each other they cause motion to be transmitted to the buckets, whereby the buckets of each twister head rotate about an axis which is intermediate them, but planetary gearing hereinafter to be described keeps the buckets upright so that the pieces of dough cannot fall therefrom. The revolution of the twister head buckets in opposite directions causes the pieces of dough to become twisted about each other starting at the center and progressively working outwardly. The arrangement is such that as the twisting progresses, the troughs are gradually withdrawn from those portions of the pieces which remain untwisted, until finally the entire lengths of both pieces are intertwined.

Since the troughs are inherently incapable of supporting the twisted portions of the pieces, other means is provided for supporting the completed portions of the loaf as the twisting progresses. Such means may take the form of cam operated fingers 28, 29 and 30, which are automatically raised as the troughs are retracted from each other. When the loaf is complete these fingers are all dropped simultaneously through slots between the several belts of a conveyor 32 whereon the loaf is discharged from the machine in readiness for baking.

The mechanism which controls the positions of the buckets during the retraction of the twister head will now be described.

The heads 21 are identical. Each is provided with a ring gear 33 as shown in Fig. 5 and Fig. 6, and bearings are provided for a turret member 34 which supports for revolution the spindles 35 upon which the individual buckets 25 are mounted. Connected with each turret 34 by means of pins 36, is a driving member 37 to which is fastened a screw 38 meshing with a fixed nut 39 carried by standard 40 near the end of the way along which the respective twister heads reciprocate. As the twister head moves outwardly, the movement of the screw 38 through the nut 39 causes the screw to rotate, thereby imparting rotation to the driving member 37 and causing rotation of the turret 34 whereby the troughs 25 are made to revolve about each other and about the turret axis which lies between them.

Carried by the pins 36 are pairs of gears 42 and 43, preferably made integrally with each other. The gear 42 of each pair meshes with the fixed ring gear 33, so that as the turret revolves the gears 42 and 43 are constrained to rotate upon pins 36. The turret also carries another pin 44 having a pair of gears 45 and 46 integrally connected with each other and free to rotate upon pin 44. Gear 45 meshes with the planetary gears 43 of the above described sets to receive rotation therefrom, and the gear 46 meshes with gears 48 on the spindles 35 which support the buckets 25. The gear ratios are such as to maintain the buckets horizontal by rotating them slowly on the axes of spindles 35 in the same ratio in which the buckets revolve about the axis of the turret. Quite obviously there are many more or less conventional sets of planetary gearing which may be substituted to perform this function.

I shall now describe the operating mechanism by which the parts are driven for the performance of the operations above described.

The control lever 26, actuated by the second piece of dough which passes through the hopper 17, is mounted on a rock shaft 49 which also carries a switch 50. This may be of the conventional mercury type adapted by its forward tilting from the position shown in Fig. 3 to cause an electrical circuit to solenoid 51 to energize the solenoid and thereby to attract the armature 52 and oscillate the rocker arm 53 in a clockwise direction as viewed in Fig. 2. This engages clutch element 54 with clutch element 55 to transmit motion from the shaft 56, (continuously driven from motor 57 through reducing gear 58) to sleeve 57a, worm 58a, and worm gear 59. As soon as the switch 50 is operated by the control member 26 to close the solenoid circuit, the latch 60 is operated by gravity to engage itself beneath the switch and support the switch in a circuit closing position. The worm gear 59 continues, therefore, to rotate.

The worm gear carries diametrically opposite crank pins 62 from which connecting rods 63 extend to the arms 64 of the respective twister heads 21, whereby each complete rotation of the worm gear 59 will cause a full reciprocation of the twister heads from their normally adjacent positions as shown in Fig. 2, to their extreme positions of separation which are approached in Fig. 1, and return.

The worm gear 59 not only carries the crank pin 62, but also carries a striker 65 which, in the course of worm gear rotation, engages a lever 67 which has its upper end in close proximity to the latch or detent 60. When this lever is struck by the striker 65, it disengages the latch 60 from beneath the switch 50 and allows the switch to oscillate to its open position. Although the solenoid circuit is no longer closed, the clutch tends to remain in engagement until the full rotation of the striker 65 causes the striker to encounter the upper end of the clutch shifting rocker arm 53. This rocker arm is oscillated by the striker in a direction to disengage the clutch and restore the solenoid armature 52 to its original position. Thereupon the worm gear 59 comes to rest in the position of the parts which is illustrated in Fig. 2.

When the above sequence of operations occurs, motion is also transmitted from sleeve 57 and pinion 68 thereof to the gear 69 connected by chain 70 with cam shaft 71 which carries suitable cams at 72 for acting on the cam follower push rods 73 to control the several fingers 28, 29, and 30 to engage them to perform the sequence of operations described above. Another cam 75 at the left end of cam shaft 71 (as viewed in Fig. 2) acts on the cam follower lever 76 which is connected by link 77 with the arm 78 of a rock shaft 79 in a flour sieve 80. Connected with rock shaft 79 are one or more wipers 81 which, in oscillating across the foraminous bottom of the sieve 80, cause flour to be sifted therethrough on to the belt 15, the hopper 17, and the tiltable baffle or gate 18 therein. These parts will ordinarily be made of highly polished material, and the buckets will likewise be very highly polished in order to prevent the dough from adhering thereto.

The conveyor 15 may be continuously driven by chain 84 from the motor driven shaft 56. The timing is such that as the twisting heads move out and back to complete and discharge the twisted loaf, the conveyor will have a fresh piece of dough ready for discharge through the hopper into the rearmost buckets 25 as soon as the mechanism comes to rest.

I claim:

1. In a dough twisting machine, the combination with a twisting head, of a turret rotatably mounted therein upon a predetermined axis, a pair of buckets carried by said turret on opposite sides of said axis and mounted for individual rotation, means for rotating said turret to revolve said buckets about each other, and means for synchronously rotating said buckets individually, whereby to maintain them in a predetermined upright position during such revolution.

2. In a dough twisting machine, the combination with a pair of twisting heads and means supporting said twisting heads for reciprocation in opposite directions, of rotatable turrets mounted in the respective heads, means for rotating said turrets upon the reciprocation of said heads, buckets individually rotatable on the respective turrets and revoluble about each other in the rotation of the turrets, means for rotating said buckets at a rate corresponding to the rotation of the turrets, whereby to maintain the buckets level in the course of their revolution, the buckets associated with the respective heads being in substantial alignment in the nearest position of said heads and being revoluble in opposite directions upon the separation of said heads, whereby to intertwist pieces of dough positioned on the initially aligned buckets.

3. In a dough twisting machine, the combination with a pair of twisting heads and means supporting said twisting heads for reciprocation in opposite directions, of rotatable turrets mounted in the respective heads, means for rotating said turrets upon the reciprocation of said heads, buckets individually rotatable on the respective turrets and revoluble about each other in the rotation of the turrets, means for rotating said buckets at a rate corresponding to the rotation of the turrets, whereby to maintain the buckets level in the course of their revolution, the buckets associated with the respective heads being in substantial alignment in the nearest position of said heads and being revoluble in opposite directions upon the separation of said heads, whereby to intertwist pieces of dough positioned on the initially aligned buckets, a set of supporting fingers movable to an advanced position to receive the weight of the intertwisted pieces of dough as said heads are separated and said buckets are withdrawn from beneath the dough, means for progressively elevating said fingers to a dough supporting position as the buckets are withdrawn.

4. In a dough twisting machine, the combination with a pair of twister heads and means supporting said twister heads for reciprocation in opposite directions, of rotatable turrets mounted in the respective heads, means for rotating said turrets upon the reciprocation of said heads, buckets individually rotatable on the respective turrets and revoluble about each other in the rotation of the turrets, means for rotating said buckets at a rate corresponding to the rotation of the turrets, whereby to maintain the buckets level in the course of their revolution, the buckets associated with the respective heads being in substantial alignment in the nearest position of said heads and being revoluble in opposite directions upon the separation of said heads, whereby to intertwist pieces of dough positioned on the initially aligned buckets, a set of supporting fingers movable to an advanced position to receive the weight of the intertwisted pieces of dough as said heads are separated and said buckets are withdrawn from beneath the dough, means for progressively lifting said fingers to a dough supporting position as the buckets are withdrawn, and a set of conveyor belts between which said fingers are receivable in their retracted position, whereby to deposit the intertwisted dough upon the belts.

5. A dough twisting machine comprising a frame providing guideway means, a pair of twister heads reciprocable to and from each other upon said guideway means, turrets rotatable in the respective heads, screw and nut means for rotating the turrets upon the reciprocation of the heads in said guideway means, pairs of troughs mounted rotatably on each turret for revolution about each other in the rotation of said turret, planetary gearing operatively connected with the respective heads, turrets, and troughs, for the rotation of the troughs to maintain their predetermined level during their revolution with the turret, hopper means for depositing elongated pieces of dough successively in the aligned troughs of the respective heads, such troughs being relatively aligned in the proximate position of said heads, and supporting means for receiving the dough from the troughs as the troughs are progressively withdrawn therefrom in the receding movement of the heads and the twisting movement of the turrets.

6. A dough twisting machine comprising a pair of dough receiving devices, a conveyor for dough pieces, and an intervening hopper provided with a gate for automatically delivering dough pieces from said conveyor alternately to different devices.

7. A dough twisting machine comprising a pair of dough receiving devices, a conveyor for dough pieces, and an intervening hopper provided with a gate for automatically delivering dough pieces from said conveyor alternately to different devices, means for actuating said devices to twist the dough pieces deposited thereon, and automatic control mechanism associated with said hopper and provided with actuating connections for setting said means in motion upon the deposit of the alternate dough pieces in a given one of said devices.

8. Dough twisting mechanism comprising a conveyor table having recessed side margins and an intervening platform, and a conveyor belt coacting with said table to roll elongated pieces of dough along said platform with the ends of such pieces overhanging the recessed margins of said table.

9. A dough twisting machine comprising two pairs of initially aligned troughs, means for depositing pieces of dough successively in alternate aligned troughs of the respective pairs, means supporting said troughs for revolution in opposite directions, means for revolving the troughs of each pair in opposite directions, and means whereby the deposit of the second piece of dough in the proper aligned troughs sets in operation the means for revolving said troughs.

10. A dough twisting machine comprising the combination with a pair of reciprocable twister heads, of means connected with said heads for the reciprocation thereof in opposite directions in a complete cycle of movement forth and back from a predetermined starting point in which said heads are near each other, mechanism limiting said head shaping means to a single cycle of operation, a starting device operatively connected to initiate the starting of the aforesaid cycle, turrets mounted in the respective heads and provided with means for rotating them in accordance with the retraction of said heads from each other, buckets mounted in the respective turrets in pairs initially aligned with the buckets of the pair in the opposite turret and revoluble about each other in opposite directions in the course of turret rotation, and means effective during turret rotation for rotating the individual buckets at a rate such as to maintain them in a predetermined level position during their revolution with the turrets, means for automatically depositing successive pieces of dough alternately upon the aligned buckets of the respective pairs, said starting means being in the path of dough deposited in one of said buckets whereby automatically to initiate said cycle.

11. A dough twisting machine comprising the combination with a pair of relatively revoluble devices for supporting opposite ends of two adjacent pieces of dough, of means for automatically delivering successive pieces of dough alternately to the respective devices, means for initiating a cycle of movement of said devices for the revolution about each other of the ends of the pieces of dough thus supported, whereby to twist the dough, and means in the path of the piece of dough deposited in one of said devices for initiating said cycle of movement.

12. In a dough twisting machine, the combination with means for twisting the ends of adjacent pieces of dough and progressively withdrawing support therefrom as the dough is twisted, a set of fingers, and means for progressively lifting said fingers to receive the twisted dough as support is withdrawn therefrom, said means being adapted to lower said fingers simultaneously when the dough is fully carried thereby, and a conveyor comprising belts spaced to receive said fingers and between which said fingers are lowered to deposit the twisted dough upon the conveyor.

13. A dough twisting machine comprising the combination with two pairs of troughs, of supports upon which the troughs of each pair are relatively revoluble, mounting means in the respective supports upon which the individual troughs are rotatable on their axes, and means for rotating said troughs upon the axes of said supporting means at a rate to maintain them substantially horizontal in the course of their revolution.

14. Dough twisting mechanism comprising the combination with a pair of turret heads reciprocable to and from each other, turrets rotatable in the respective heads, troughs carried in pairs by the turrets and provided with individually rotatable supports therein, and means operating in accordance with the reciprocation of the turret heads for rotating the turrets from an initial position in which the opposite pairs of troughs are substantially aligned to revolve the turrets of each pair about each other in opposite directions, and means for depositing strips of dough in the aligned troughs to be intertwisted upon the revolution of said troughs.

15. The combination with a machine bed and a conveyor for receiving twisted pieces of dough, of guideways in said bed, turret heads reciprocable in said guideways to and from each other in a direction transverse to that of the movement of said conveyor, turrets rotatable in said heads, troughs carried by said turrets for revolution about each other in the rotation thereof, each of said troughs having an individually rotatable support and means for maintaining it horizontal in the course of turret rotation, mechanism for rotating said turrets in the course of turret head separation from an initial position in which the opposing troughs of said heads are in substantial alignment, and means for depositing pieces of dough upon the aligned troughs to be intertwisted thereby, the intertwisted pieces of dough being exposed for deposit on the conveyor upon the withdrawal of said troughs occasioned by the separation of said turret heads.

CHARLES J. KUMMER.